INVENTOR
WILLIAM J. HOOD

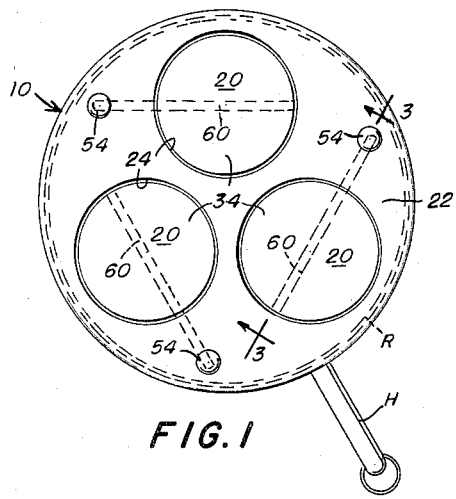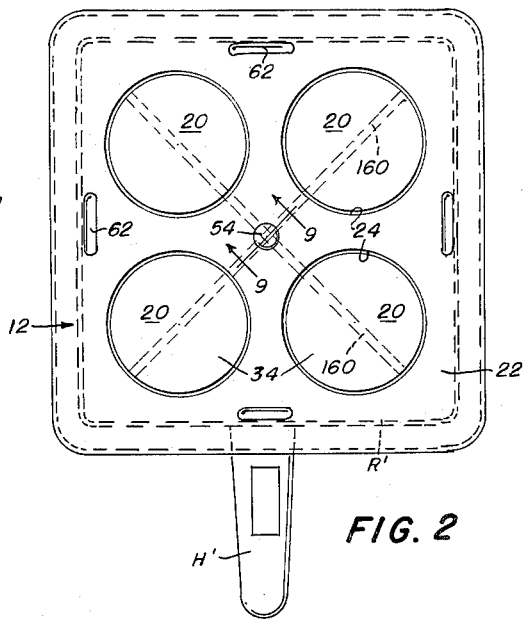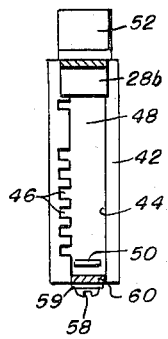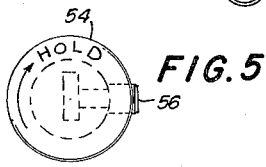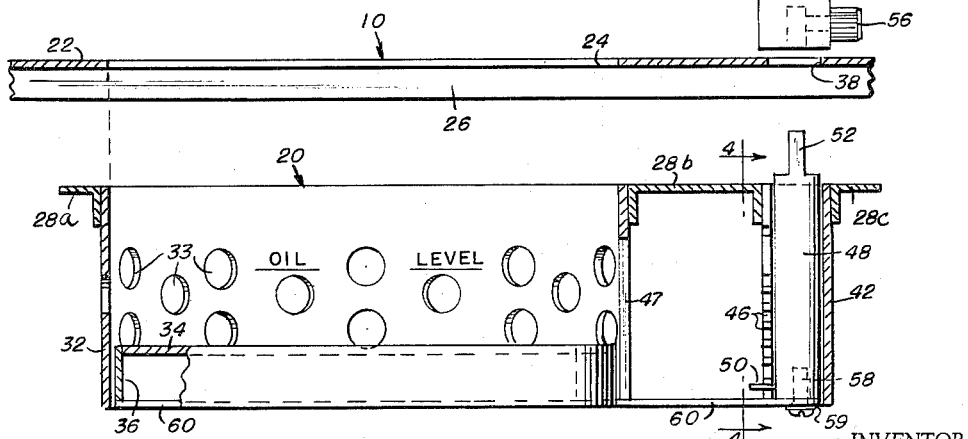
INVENTOR
WILLIAM J. HOOD
BY Beale & Jones
ATTORNEYS Sept. 26, 1961 W. J. HOOD 3,001,468
DEEP FAT COOKING APPARATUS HAVING COOKING
PLATE OF ADJUSTABLE HEIGHT
Filed March 28, 1960 2 Sheets-Sheet 2

BY Beale & Jones

ATTORNEYS

DEEP FAT COOKING APPARATUS HAVING COOKING PLATE OF ADJUSTABLE HEIGHT

William J. Hood, Austin, Tex.
(Round Rock, Tex.)
Filed Mar. 28, 1960, Ser. No. 17,871
2 Claims. (Cl. 99—407)

This invention relates to a cooking apparatus having a cooking plate adapted to be submerged in a cooking fluid, such as oil. More specifically, this invention relates to a cooking apparatus including support means and a cooking plate, said support means adapted adjustably to support the cooking plate submerged to the degree desired in a cooking fluid such as oil.

In the past it has been customary to cook eggs on a cooking plate having a thin layer of fat or oil thereon. The oil keeps the eggs from sticking to the cooking plate.

I have discovered that an egg cooked completely submerged in cooking oil on an imperforate flat cooking plate will assume a desirable flavor and be shaped into a compactness not characterizing an egg cooked out of oil. I have also found that eggs cooked this way are uniform in size one to the next and that they all have the same desirable texture and consistency. For the sake of appearance alone, it is desirable that consecutively cooked eggs have similar characteristics as they issue from the cooker, especially when the eggs are cooked commercially, as in a restaurant.

In addition, I have found that if the degree to which a cooking plate is submerged in oil is altered, the "style" of the egg cooked is altered accordingly.

I, therefore, have developed a cooking apparatus including an imperforate cooking plate which can be submerged in oil to a desired degree by a simple easy adjustment of one of its elements. My apparatus has the advantage that eggs and the like may be cooked different "styles" such as "blindfolded," "sunny side up," and "over easy" in the same device by making an easy adjustment. After cooking, the plate may be raised to a level flush with the top of the apparatus and the egg may be removed with a spatula.

It is, therefore, an object of this invention to provide an apparatus including means for cooking an egg or the like on a submerged imperforate cooking plate.

It is a further object of this invention to provide means for supporting a cooking plate whereby the degree of which the plate is submerged in a cooking fluid may be adjusted.

It is a further object of this invention to provide a cooking apparatus for cooking eggs submerged in a cooking fluid whereby the egg may be raised for removal when the cooking is completed.

This invention embodies other novel features, details of construction and arrangement of parts which are hereinafter set forth in the specification and claims, and illustrated in the accompanying drawings, wherein:

FIGS. 1 and 2 are top plan views of apparatuses having multiple units embodying my invention;

FIG. 3 is an enlarged fragmentary sectional view partially exploded and taken on the line 3—3 of FIG. 1;

FIG. 4 is a fragmentary sectional view taken on the line 4—4 of FIG. 3;

FIG. 5 is a top plan view of a control element which may be used in an apparatus according to my invention;

Figure 6:
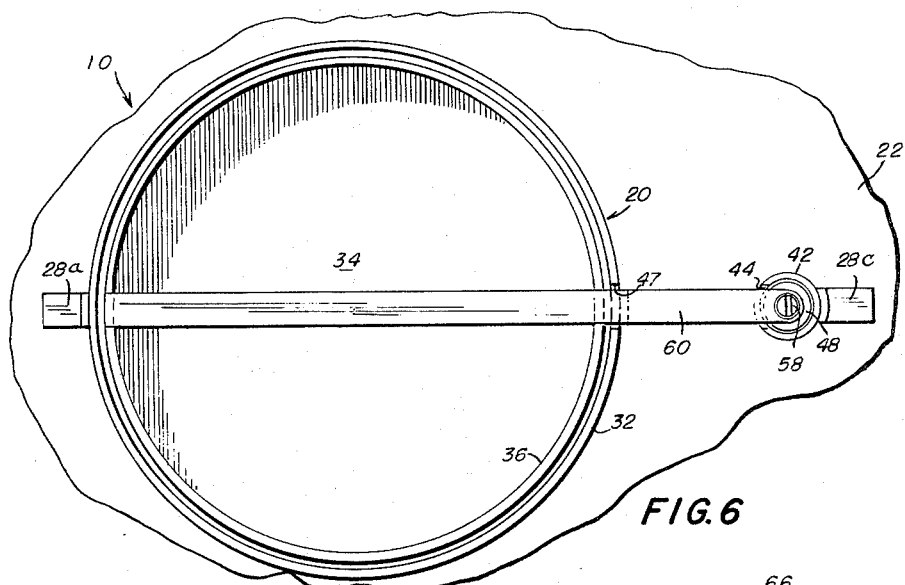
FIG. 6 is a fragmentary bottom plan view of a unit embodying the invention.

Briefly, my invention is a deep-fat cooking apparatus including support means adapted to be placed over a receptacle, and an imperforate cooking plate adapted to be disposed in such receptacle. The support means includes a depending member engaging the imperforate cooking plate in supporting relation.

Referring more specifically to the drawings, FIG. 1 shows an apparatus incorporating three units embodying the invention. The apparatus is generally designated 10. As shown, it fits over the top of the conventional skillet having rim R and handle H. This skillet may be of the type which is adapted to rest on a heating element on a gas or electric stove. FIG. 2 shows another apparatus which incorporates four units embodying my invention. This apparatus is designated 12. It may be placed over a skillet of the square type having an electric heating element therein. The rim R' of this skillet is designated in broken lines and the handle is designated H'.

An individual unit embodying my invention is shown in FIG. 3. The individual unit is designated 20. It comprises a cover member 22 having a large opening 24 therein. The margin of the cover member may have a depending lip 26 and secured adjacent the opening 24 the cover member 22 may have two diametrically opposed depending brackets 28a and 28b. Secured to the brackets 28 in this opening and directed downwardly therefrom is a cylindrical wall 32 which is perforated as at 33. An imperforate cooking plate 34 slidably fits within this wall. The plate 34 is horizontally disposed and has a short circular skirt 36 depending therefrom. Preferably, the skirt 36 is only slightly less in diameter than the cylindrical wall so that the vertical movement of the plate within the circular wall 32 is restrained from lateral deviation much the way a piston is confined to movement in one direction within its cylinder. The cover member 22 has a smaller opening 38 adjacent the large opening 24, and adjacent the smaller opening the bracket 28b is formed with a second depending flange. A third depending attaching bracket 28c is attached to the cover member on the opposite side of the smaller opening from bracket 28b. Secured to brackets 28b and 28c in the smaller opening is a downwardly directed sleeve 42 depending about to the depth of the lowest portion of the cylindrical wall 32. On its side adjacent the cylindrical wall, the sleeve has a longitudinally extending interruption 44 (see FIG. 4). On one side this interruption has short vertically spaced transversely directed notches 46. The circular wall 32 has a longitudinal opening 47 in the side adjacent sleeve 42.

A shaft 48 is slidably disposed within the sleeve 42 and includes an outwardly extending stud element 50. The upper end of the shaft 48 may have flattened faces 52 at diametrically opposite points and may receive a control member or knob 54. One of the flattened faces 52 is engaged by the inner end of a screw 56 fitting into a threaded opening in the knob 54 to hold the shaft and the knob together in unitary fashion. The lower end of the shaft has a central, upwardly directed opening. A support arm 60 is provided. One end of the support arm 60 is apertured and attached to the lower end of the shaft 48 by a bolt 58 extending through the aperture and into the threaded opening in the bottom of the shaft. The bolt is not drawn up snugly against the arm but instead may be equipped with a washer 59 and may be somewhat loose to permit relative rotation between the shaft 48 and the support arm 60. The opposite end of the support arm is secured to the lower edges of the depending skirt 36 of the imperforate cooking plate 34.

By means of the above-described structure, the height of the imperforate cooking plate 34 may be adjusted by raising or lowering the control element or knob 54. When the desired height of the imperforate cooking plate is reached, the knob is merely turned counter-clockwise a short distance to move the stud element 50 into one of the transverse notches 46 as shown in FIG. 4. This locks the plate 34 at the desired height.

Figure 9:
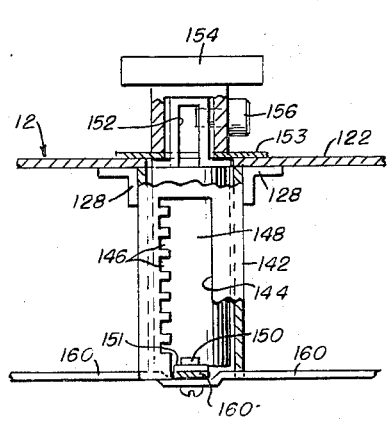
FIG. 9 is an enlarged fragmentary sectional view taken on the line 9—9 of FIG. 2.
Figure 10:
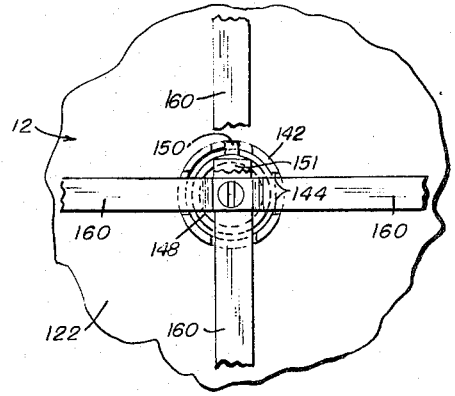
FIG. 10 is a fragmentary bottom plan view of the control element shown in FIG. 2 partly broken away to show the stud element.

A control unit for multiple units according to my invention is shown in FIGS. 9 and 10. Reference numerals have been taken from the parts of FIG. 4 and increased by 100 to designate corresponding parts in this embodiment. A primary difference between the FIG. 4 and the FIG. 9 embodiments is that the lower end of the shaft 148 of FIG. 9 has attached thereto a plurality of arms 160 which extend in various directions to support the various cooking plates. A washer 153 may interpose knob 154 and cover member 122. Thus, when the control knob 154 is raised or lowered all of the plates are raised or lowered together accordingly.

In the FIG. 9 and 10 embodiment, the "shaft" 148 may actually be a hollow tube to the upper end of which may be secured an inverted U-shaped structure to comprise the flattened "faces" 152 apertured to receive the end of screw 156. Similarly, the lower end of the "shaft" 148 may have a cross member 151 to receive the bolt which supports arm 160.

In an alternative apparatus having multiple units, the units may be controlled independently and arranged as shown in FIG. 1.

Figure 7:
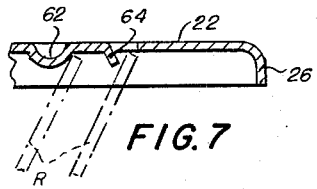
FIGS. 7 and 8 are fragmentary sectional views illustrating attachment means whereby the apparatus of the invention may be secured to a cooking receptacle.
Figure 8:
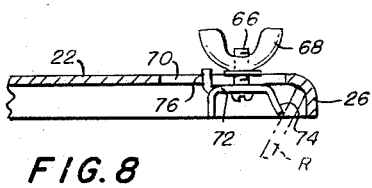

Apparatus acording to my invention may take the form of a utensil complete in itself including receptacle and cooperating cover member. Alternatively, the apparatus may include the cover member 22 as shown in FIG. 1 fitting over a conventional cooking receptacle. Means for attaching the cover member to such a receptacle is shown in FIGS. 7 and 8. In FIG. 7 the cover member 22 may be formed with a depression 62 adapted to frictionally engage inside the rim R of the receptacle. It also may be provided with a struck-down lip 64 adapted to frictionally engage the rim R of the receptacle. As shown in FIG. 8, the attachment means may include an adjustable device comprising a bolt 66 and wing nut 68 arrangement fitting slidably within a slot 70 in the cover member. The head of the bolt may have a clamp member 72 with a depending lip 74 secured thereto. In use the lip engages the inside of the rim R of the receptacle. The clamping member may have an upstanding lug 76 fitting in the slot preventing relative rotating movement between the bolt 66 and the cover member.

In use, the receptacle is filled with oil or other cooking fluids to the "oil level" line shown in FIG. 3. The perforations 33 permit free flow of cooking oil through the wall 32. The receptacle is heated. After an appropriate temperature has been reached, the cooking plate 34 may be raised above the level of the oil and the egg is broken into it. Wall 32 will confine the egg. If the egg is to be cooked "sunny side up," the plate 34 may be lowered to the surface of the cooking oil. If the egg is to be cooked "blindfolded," the plate 34 is lowered until the egg is completely submerged. The egg is left in this position until it takes on the desired appearance. If the egg is to be cooked "over easy," the steps for "blindfolding" are accomplished only the egg is allowed to cook submerged for a slightly longer period. When the egg is done, the control 54 is lifted upwardly until the plate is flush with the cover member 22. The egg is then removed with a spatula.

Thus, I have invented an apparatus for cooking eggs submerged in oil. By means of my apparatus cooking is much easier than before and I achieve a uniformity in the size and the shape of the egg. I also obtain new ease in handling the egg.

While this invention has been shown in but one form, it is obvious to those skilled in the art that it is not so limited but is susceptible of various changes and modifications without departing from the spirit and scope of the claimed invention.

I claim:

1. A deep fat cooking apparatus comprising a receptacle and a cover member engaging the rim of the receptacle, said cover member having an opening therein, a flat imperforate cooking plate positioned under said cover member in alignment with said opening, said cover member having a second opening, substantially smaller than said first opening, adjacent said first opening, a longitudinally slotted sleeve attached to said cover member about said second opening and depending therefrom, a shaft slidably and rotatably disposed in said sleeve, the upper end of said shaft bearing operating means, an arm attached to the lower end of said shaft and supporting said imperforate cooking plate, said shaft having a stud extending perpendicularly therefrom, said sleeve having spaced transverse stud-receiving notches adjacent said slot, whereby the shaft can be moved vertically to adjust the height of said imperforate plate and can be rotated to move the stud into a selected notch to fix the height of the plate.

2. A deep fat cooking apparatus as described in claim 1 wherein said first opening has a downwardly extending perforate wall thereabout and said plate is slideably received within said wall.

References Cited in the file of this patent

UNITED STATES PATENTS

| | | |
|---|---|---|
| 476,851 | Williams | June 14, 1892 |
| 1,255,014 | Janiszewski | Jan. 29, 1918 |
| 1,342,444 | Howe | June 8, 1920 |